US006305338B1

(12) United States Patent
Kramer et al.

(10) Patent No.: US 6,305,338 B1
(45) Date of Patent: Oct. 23, 2001

(54) CURRENT MEASUREMENT MODULE FOR AN INTERNAL COMBUSTION ENGINE STARTER DEVICE

(75) Inventors: Claus Kramer, Besigheim; Karl-Otto Schmid, Keltern; Elmar Huber, Eisenach; Uwe Daurer, Ludwigsburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/462,808

(22) PCT Filed: Aug. 12, 1997

(86) PCT No.: PCT/DE97/01713

§ 371 Date: Jan. 12, 2000

§ 102(e) Date: Jan. 12, 2000

(87) PCT Pub. No.: WO99/03709

PCT Pub. Date: Jan. 28, 1999

(30) Foreign Application Priority Data

Jul. 17, 1997 (DE) ............................................. 197 30 635

(51) Int. Cl.[7] ............................ F02N 11/00; B60R 16/02

(52) U.S. Cl. ...................................... 123/179.3; 290/38 R

(58) Field of Search ....................... 123/179.3; 290/38 R, 290/38 C; 324/117 R, 117 H

(56) References Cited

U.S. PATENT DOCUMENTS

| | | | | |
|---|---|---|---|---|
| 5,517,104 | * | 5/1996 | Kawakami | 324/117 R |
| 5,622,148 | * | 4/1997 | Xue et al. | 123/179.3 |
| 5,743,227 | * | 4/1998 | Jacquet et al. | 123/179.3 |
| 5,934,237 | * | 9/1999 | Vilou | 123/179.3 |
| 5,983,850 | * | 11/1999 | Vilou | 123/179.3 |
| 5,992,365 | * | 12/1999 | Vilou | 123/179.3 |

* cited by examiner

*Primary Examiner*—Andrew M. Dolinar
*Assistant Examiner*—Arnold Castro
(74) *Attorney, Agent, or Firm*—Michael J. Striker

(57) ABSTRACT

A current measuring module for a starter device of an internal combustion engine has a measuring device which measures a starter current of a starter motor, a soft-iron core which at least partly surrounds a conductor carrying a starter current and carries a magnetic field sensor, and control electronics controlled by the magnetic field sensor and generating a control signal for switching off the starter motor when a switch-off current of the starter motor is reached.

10 Claims, 4 Drawing Sheets

Fig. 3c
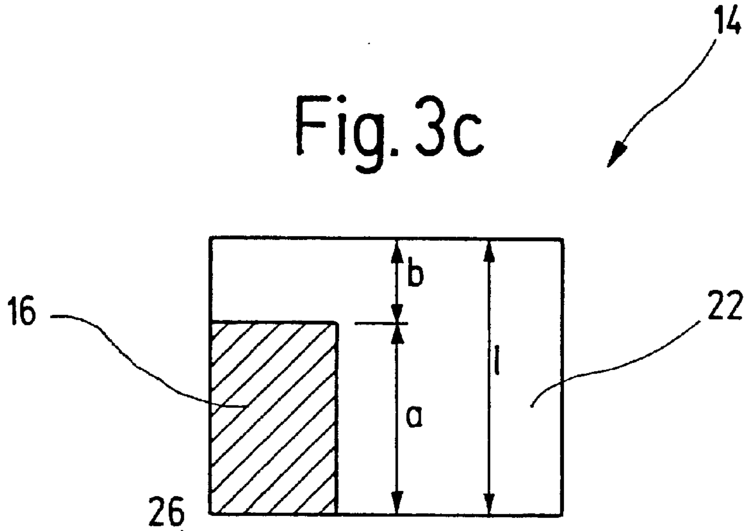
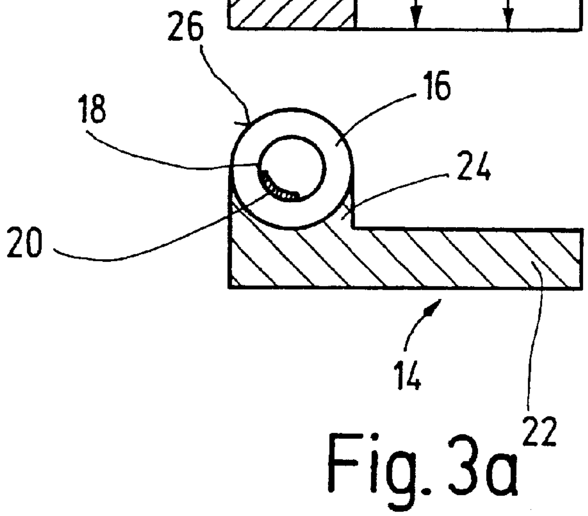
Fig. 3a
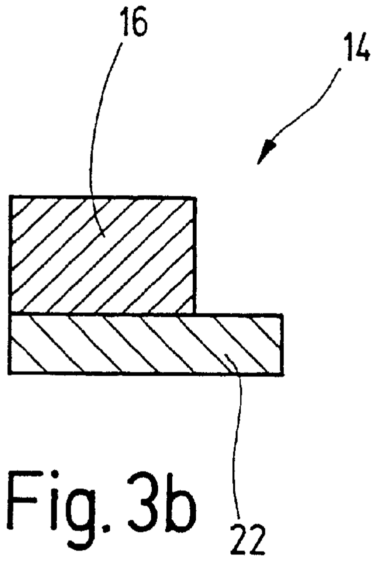
Fig. 3b

CURRENT MEASUREMENT MODULE FOR AN INTERNAL COMBUSTION ENGINE STARTER DEVICE

BACKGROUND OF THE INVENTION

The invention is directed to a current measuring module for a starter device of internal combustion engines with a measuring device which measures a starter current of a starter motor.

It is known that internal combustion engines must be started by means of a starting mechanism because they cannot start by themselves. Starter motors are usually used for this purpose. These starter motors are connected with a voltage source via a starter relay constructed as an engagement relay, as they are called, and a pinion of the starter motor is simultaneously engaged with a toothed rim of a flywheel of the internal combustion engine for cranking. In order to switch on the starter relay, it is known to control this starter relay by means of an external switch, for example, an ignition switch or starter switch of the motor vehicle. After the internal combustion engine has begun to run independently, the starter motor must be disengaged to prevent noise and wear. It is known to switch off the starter manually by releasing the ignition switch or starter switch. Solutions for turning off the starter of the internal combustion engine automatically for increased convenience in motor vehicles are known. In order to detect independent running of the internal combustion engine, an evaluation of a starter current can be carried out. The fact that the starter current changes its shape depending on the independent running of the internal combustion engine is made use of for this purpose. When the internal combustion engine reaches its independent running rotational speed, i.e., develops its own torque, the starter motor is overtaken with respect to its rotational speed, wherein the starter motor is separated from the internal combustion engine by a freewheeling clutch. From this point, the starter motor need only apply its own acceleration torque, so that the starter current drops to the idle current or no-load current. Therefore, when the starter motor reaches the no-load current, this signals the independent running of the internal combustion engine.

It is known from general electronic engineering that a conductor carrying current is surrounded by a magnetic field proportional to the current.

SUMMARY OF THE INVENTION

In accordance with the present invention in a current measuring module, a soft-iron core is provided which at least partly surrounds a conductor carrying the starter current and carries a magnetic field sensor, and control electronics are controlled by the magnetic field sensor and generate a control signal for switching off the starter motor when a switch-off current of the starter motor is reached.

The magnetic field sensor can be arranged in a coaxial ring gap between the soft-iron core and the conductor, and the current-carrying conductor can be formed by a contact bolt of a starter relay of the starter device, or by a connection contact of the starter motor.

When the current measuring device is designed in accordance with the present invention it offers the advantage that an evaluation of the starter current is made possible in a simple manner. A simple evaluation of the starter current is made possible without direct intervention in the starter motor by providing a soft-iron core which at least partly surrounds a conductor carrying the starter current and carries a magnetic field sensor and by providing electronics which are controlled by the magnetic field sensor and which generate a control signal for switching off the starter motor when a switch-off current, especially a no-load current, of the starter motor is reached. In particular, structural changes in the construction of the starting device as a whole are not necessary because the current measuring module according to the invention can be adapted in a simple manner to existing starter devices. Moreover, there is no need for any changes to the existing electric connection lines of the starter device.

BRIEF DESCRIPTION OF THE DRAWINGS

The invention will be described more fully in the following with reference to embodiment examples shown in the accompanying drawings.

FIGS. 3*a* to 3*c* show schematic views of a current measuring module;

DESCRIPTION OF THE PREFERRED EMBODIMENTS

Figure 1:
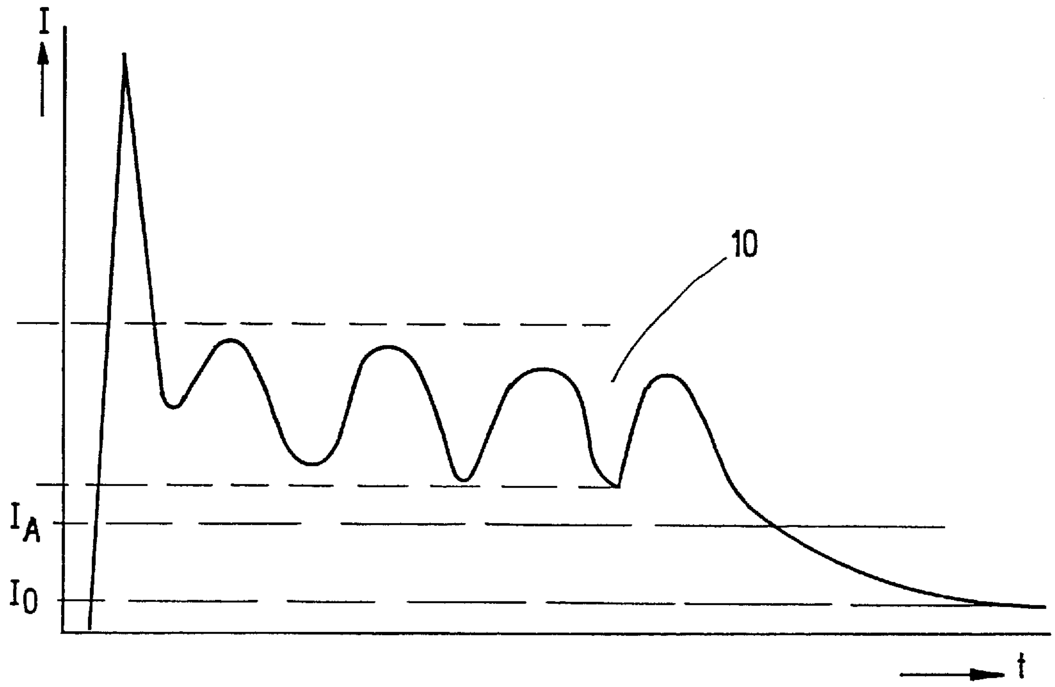
FIG. 1 shows the shape of the starter current of a starter motor.

FIG. 1 shows the curve of a starter current I of a starter motor of an internal combustion engine over time t. When the starter motor is switched on, the starter current I climbs to a maximum value (startup current) and then passes into a ripple area 10. The ripple of the starter current I results from the alternating compression and decompression phases of the internal combustion engine during the starting phase. When the internal combustion engine achieves independent running, the starter current I passes into the no-load current $I_0$. A switch-off current lying below the ripple area 10 is designated by $I_A$. When the current falls below the switch-off current $I_A$, it is certain that the internal combustion engine is running independently and the starter motor can be switched off.

Figure 2:
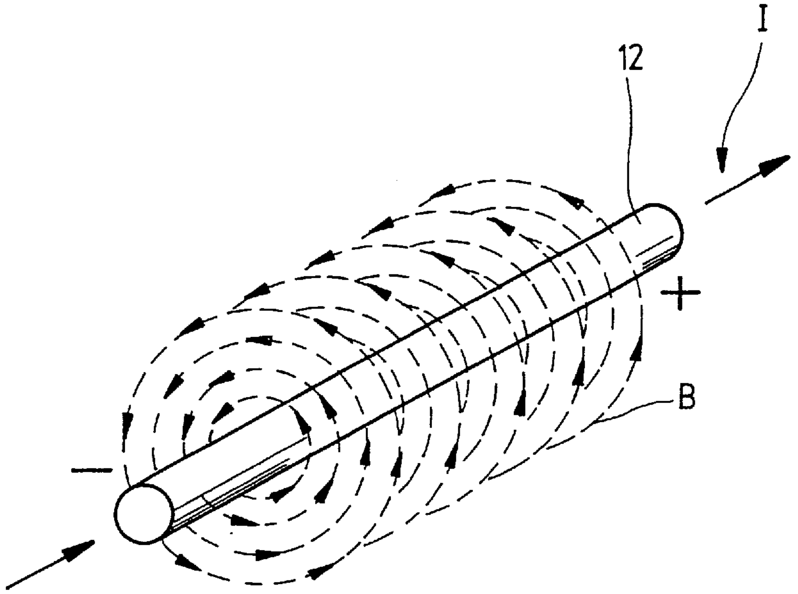
FIG. 2 shows a schematic view of a magnetic field surrounding a current-carrying conductor.

FIG. 2 shows that a conductor 12 through which current I flows generates a magnetic field B. The magnetic field B is proportional to the current I.

FIGS. 3*a* to 3*c* show a current measuring module 14 by means of which the starter current I is measured by detecting the magnetic field B. The current measuring module 14 is shown in a front view (FIG. 3*a*), a side view (FIG. 3*b*) and a top view (FIG. 3*c*). The current measuring module 14 comprises a sleeve-shaped soft-iron core 16. The soft-iron core 16 has an axial through-opening 18 which is preferably round and whose diameter is greater than an electric conductor 12 (not shown in FIG. 3) guided through the soft-iron core 16. Accordingly, a coaxial air gap remains between the electric conductor 12 and the soft-iron core 16. A magnetic field sensor 20 which is only indicated schematically is arranged in this air gap. The magnetic field sensor 20 can be, for example, a Hall sensor or a field plate, as it is called. The function of magnetic field sensors 20 is generally known and will not be discussed further within the framework of the present description. A magnetic field sensor 20 has electric connection contacts to which a signal voltage is applied depending on a magnetic field B acting on the magnetic field sensor, wherein the signal voltage is proportional to the magnetic field B.

The soft-iron core 16 is arranged on a base plate 22 made from a nonmagnetic, electrically nonconducting material which is made of plastic, for example. In order to arrange the soft-iron core 16 on the base plate 22, injection molding can be carried out around the soft-iron core 16, for example, with a plastic forming the base plate 22, so that the corresponding holding area 24 and a casing 26 of the soft-iron core 16 is formed simultaneously in addition to the base plate 22. The electronics for evaluating the signal voltage supplied by the magnetic field sensor 20 can be integrated in the base plate 22 at the same time.

Figure 4A:
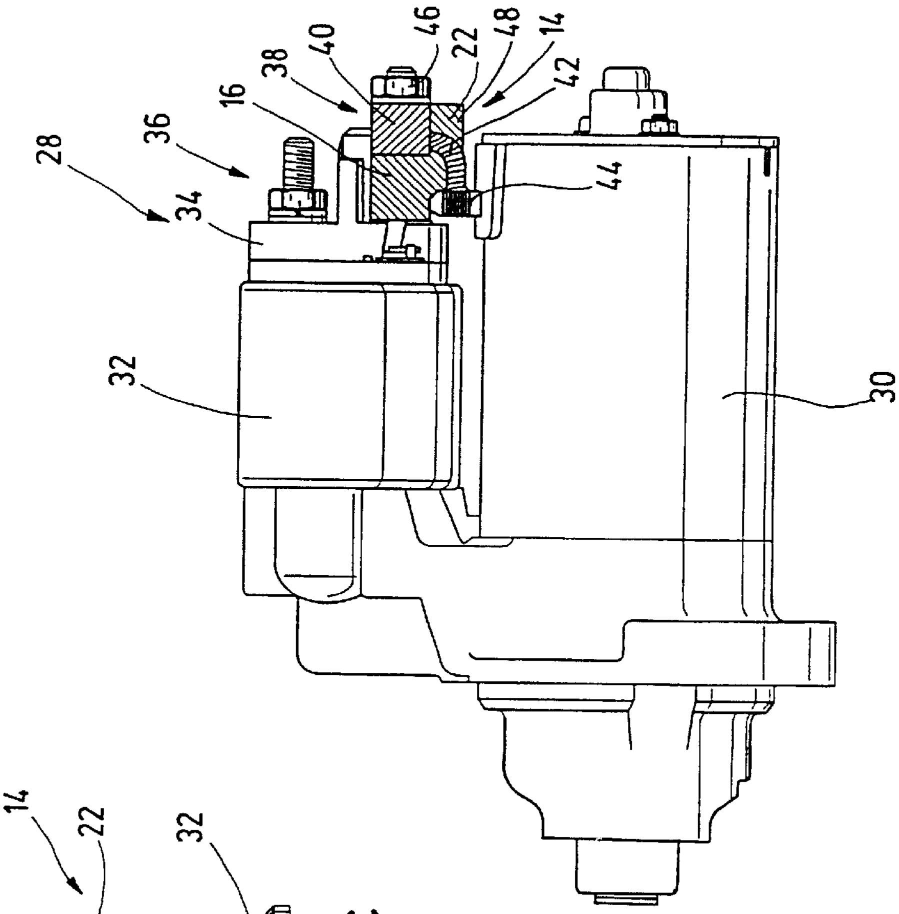
FIGS. 4*a* to 4*c* show a possible arrangement of the current measuring module at a starter device.

FIG. 4*a* shows a side view of a starter device 28 for an internal combustion engine, not shown, of a motor vehicle. The starter device 28 comprises a starter motor 30 and a starter relay 32 constructed as an engagement relay. The starter motor 30 is connected with a motor vehicle battery of the motor vehicle by means of the starter relay 32 on the one hand and a pinion of the starter motor is engaged with the internal combustion engine on the other hand. The starter relay 32 has a contact space 34 within which a contact bridge connects two contact bolts 36 and 38 with one another. The contact bolt 36 is connected via an electric connection line, not shown, with the positive pole of the motor vehicle battery. The contact bolt 38 is lengthened in such a way that it can receive the current measuring module 14 on the one hand and a cable lug 40 on the other hand. The cable lug 40 is connected with a connection 44 projecting out of the starter motor 30 by an electric line 42 which is preferably constructed as a stranded wire. The current measuring module 14 is slid over the contact bolt 38 with its soft-iron core 16. The arrangement of the current measuring module 14 and the cable lug 40 on the contact bolt 38 is locked by means of a fastener 46, for example, a threaded nut.

The size of the base plate 22 of the current measuring module 14 is adapted to the design factors of the starter device 28, so that already existing installation space can be utilized for receiving the current measuring module 14 without the need for structural changes to the starter device 28. The base plate 22 of the current measuring module 14 has a greater edge length I than an axial extension a of the soft-iron core 16 as is shown in the top view in FIG. 3*c*. In this way, the cable lug 40 can be located in area b which is given by the difference between edge length I and axial extension a.

As a result of the discovered arrangement of the current measuring module 14, the starter current I flows over the contact bolt 36, the contact bridge of the starter relay 32, the contact bolt 38, the cable lug 40, the stranded wire 42 and the connection 44 to the starter motor 30 when the starter motor 30 is switched on. The soft-iron core 16 is incorporated in this electric connection path in that it surrounds the contact bolt 38 in some areas. Analogous to FIG. 2, the contact bolt 38 forms the electric conductor 12 which is surrounded by a magnetic field proportional to the starter current I. Corresponding to the magnetic field B detected by the magnetic field sensor 16, a control signal is fed via lines, not shown in detail in FIG. 4*a*, to control electronics which can be integrated, for example, in the base plate 22. This control signal is proportional to the magnetic field B which is measured by the magnetic field sensor 16 and which is in turn proportional to the starter current I. Corresponding to the switch-off limit of the starter current I discussed with reference to FIG. 1, current dropping below the switch-off current $I_A$ is detected. When the current falls below the value $I_A$ the control electronics 48 provide a control signal for switching off the starter motor 30. This control signal causes switching means connecting the starter relay 32 with a control voltage to open so that the contact bridge of the starter relay 32 separates the contact bolts 36 and 38.

Finally, an automatic switching off of the starter device 28, especially the starter motor 30, is made possible without extensive structural effort by means of a simply constructed current measuring module when the internal combustion engine achieves independent running. The construction of the starter device 28 and the mounting of the starter device 28 in motor vehicles need not be changed in order to arrange the current measuring module 14, so that the advantages of large-series manufacture with respect to cost are retained. If need be, a contact bolt 38 whose length is only increased by the axial extension a of the soft-iron core 16 is used. Likewise, the electric connection lines to the starter device 28 in motor vehicles need not be changed. Only an additional connection line from the control electronics 48 to a switch-off device of the starter device 28 is necessary. Further, the current measuring module 14 can be retrofitted in a simple manner by means of the discovered arrangement in motor vehicles which are already in operation. Moreover, it is also readily possible, if necessary, to exchange the current measuring module 14 in a simple manner without having to disassemble the entire starter device 28. Due to its simple and generally applicable construction, the current measuring module 14 can be used in many different types of starter device 28, so that it is not necessary to provide or stock different current measuring modules 14. The dimensioning of the contact bolts, especially contact bolt 38, is essentially identical in all of the starter devices 38 in use, so that it is not necessary to adapt the current measuring module 14, especially the through-opening 18 of the soft-iron core 16, to different starter devices 28.

Figure 4C:
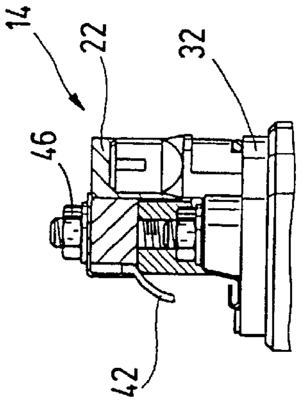
Figure 4B:
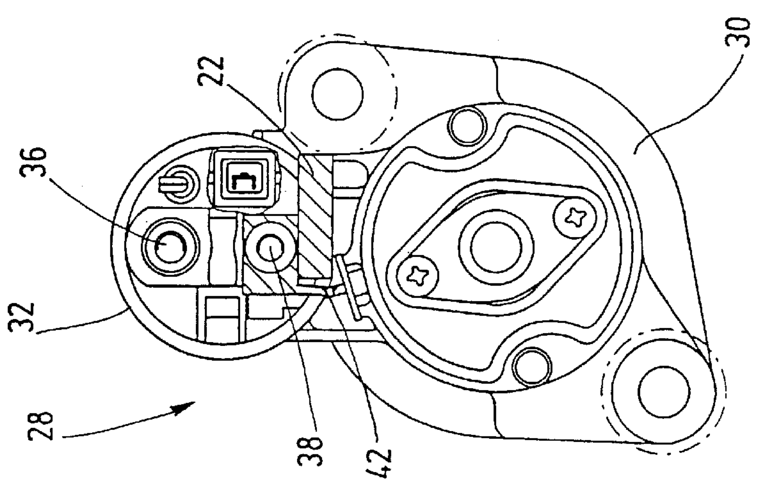

FIGS. 4*b* and 4*c* show different views of the arrangement of the current measuring module 14 on the contact bolt 38. In particular, the front view according to FIG. 4*b* shows that the base plate 22 receiving the control electronics 48 can be integrated in a free installation space between the relay cover of the starter relay 32 and the starter motor 30. Moreover, identical parts are provided with the same reference numbers and are not discussed further.

Figure 5:
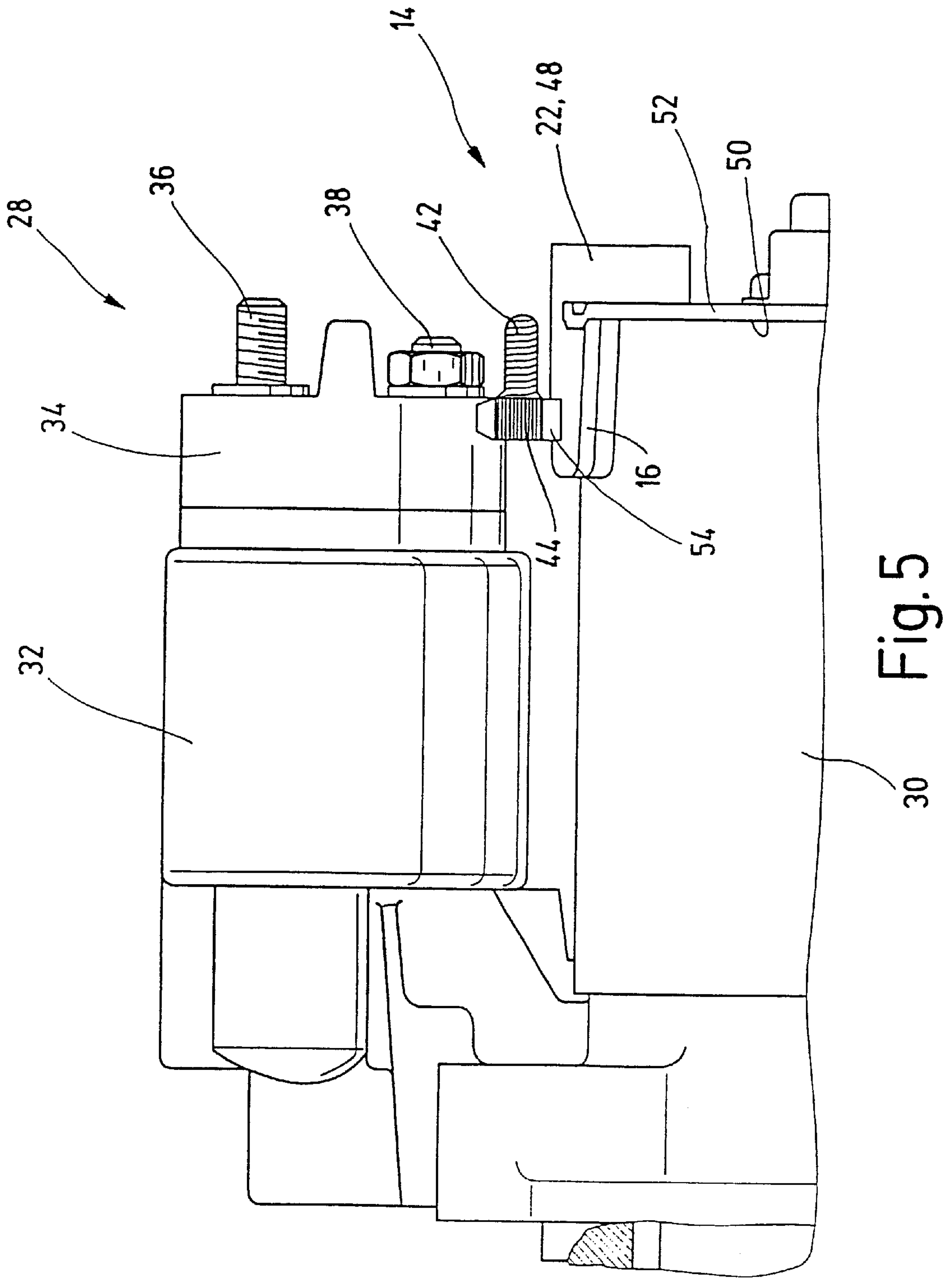
FIG. 5 shows another possible arrangement of the current measuring module at a starter device.

FIG. 5 shows another construction variant of the arrangement of a current measuring module 14 at a starter device 28. Parts identical to those in the preceding Figures, especially FIG. 4*a*, are provided with the same reference numbers and are not further described.

In the construction variant shown in this case, the current measuring module 14 is arranged at a housing 50, especially a commutator cover 52, of the starter motor 30. In this way, the current measuring module 14 is arranged in the vicinity of the electric connection 44 of the starter motor 30. The electric connection 44 comprises a busbar or conductor rail 54 which projects out of the interior of a pole pipe of the starter motor 12. The electric connection line (stranded wire) 42 is fixedly connected, e.g., welded, to this conductor rail 54 in an electrically conducting manner by its cable lug 40. For mounting purposes, the soft-iron core 16 can be slid over the conductor rail 54 projecting out of the starter motor 30 by means of the arrangement of the current measuring module 14 shown in FIG. 5, wherein the electrically conducting connection between the conductor rail 54 and the connection line 42 is produced subsequently.

The soft-iron core 16 accordingly projects axially from the base plate having the control electronics 48 and surrounds the conductor rail 54. The magnetic field sensor 20, not shown here, is arranged between the conductor rail 54 and the soft-iron core 16. The conductor rail 54 accordingly forms the electric conductor designated by 12 in FIG. 2. According to the embodiment example shown in FIG. 5, the soft-iron core 16 is not annular, but extends in an oval shape from the base plate 22. This has no effect on the detection of the magnetic field B or, therefore, on the starter current I. The base plate 22 with the control electronics 48 can be fastened to the commutator cover 52, for example, via suitable snap, plug or screw connections.

What is claimed is:

1. A starter device for internal combustion engines, comprising a starter motor; a current measuring module which measures a starter current of said starter motor, said starter measuring module including a magnetic field sensor; control electronics controlled by said magnetic shield sensor and generating a control signal for switching off said starter motor when a switch-off current of said starter motor is reached; a conductor carrying said starter current, said current measuring module including a soft-iron core which at least partly surrounds said conductor, said soft-iron core having a through-opening which is greater than said conductor so that a coaxial ring gap remains between said soft-iron core and said conductor, said magnetic field sensor being arranged in said coaxial ring gap; and a starter relay which has a contact bolt which forms said current-carrying conductor, said starter motor has an electrical connection contact; and further comprising a fastener which locks said current measuring module and simultaneously clamps an electric connection between said contact bolt of said starter relay and said electrical connection contact of said starter motor.

2. A starter device as defined in claim 1, and further comprising a base plate in which said control electronics are integrated, said soft-iron core being arranged on said base plate.

3. A starter device as defined in claim 2, wherein said base plate forms a holding area for receiving said soft-iron core; and further comprising a casing for said soft-iron core, said base plate, said holding area, and said casing being formed from a plastic injection-molded part.

4. A starter device as defined in claim 1, wherein said measuring module is formed so that a no-load current of said starter motor is detected as the switch-off current.

5. A starter device for internal combustion engines, comprising a starter motor; a current measuring module which measures a starter current of said starter motor, said starter measuring module including a magnetic field sensor; control electronics controlled by said magnetic shield sensor and generating a control signal for switching off said starter motor when a switch-off current of said starter motor is reached; a conductor carrying said starter current, said current measuring module including a soft-iron core which at least partly surrounds said conductor, said soft-iron core having a through-opening which is greater than said conductor so that a coaxial ring gap remains between said soft-iron core and said conductor, said magnetic field sensor being arranged in said coaxial ring gap, said starter motor having a connection contact which forms said current-carrying conductor, said starter motor having a commutation cover, said current measuring module being arranged at said commutation cover.

6. A starter device as defined in claim 5, wherein said starter motor has a housing, said current measuring module being arranged in said housing.

7. A starter device as defined in claim 5, wherein said measuring module is locked to said commutator cover with a base plate, said soft-iron core projecting axially from said base plate and engaging around a conductor rail which forms said connection contact and projects over said housing.

8. A starter device as defined in claim 5, and further comprising a base plate in which said control electronics are integrated, said soft-iron core being arranged on said base plate.

9. A starter device as defined in claim 8, wherein said base plate forms a holding area for receiving said soft-iron core; and further comprising a casing for said soft-iron core, said base plate, said holding area, and said casing being formed from a plastic injection-molded part.

10. A starter device as defined in claim 5, wherein said measuring module is formed so that a no-load current of said starter motor is detected as the switch-off current.

* * * * *